(12) United States Patent
Pane et al.

(10) Patent No.: US 9,157,485 B2
(45) Date of Patent: Oct. 13, 2015

(54) STIFFNESS ADJUSTABLE ROTARY JOINT

(75) Inventors: Gianluca Pane, Ivrea (IT); Nikos G. Tsagarakis, Genoa (IT); Amir Jafari, Genoa (IT); Darwin G. Caldwell, Serra Ricco' (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 13/825,483

(22) PCT Filed: Sep. 23, 2011

(86) PCT No.: PCT/IB2011/054193
§ 371 (c)(1),
(2), (4) Date: Mar. 21, 2013

(87) PCT Pub. No.: WO2012/038931
PCT Pub. Date: Mar. 29, 2012

(65) Prior Publication Data
US 2013/0178297 A1 Jul. 11, 2013

(30) Foreign Application Priority Data

Sep. 23, 2010 (IT) .............................. TO2010A0779
Feb. 8, 2011 (IT) .............................. TO2011A0100

(51) Int. Cl.
*F16F 15/123* (2006.01)
*F16D 3/66* (2006.01)
(Continued)

(52) U.S. Cl.
CPC ............... *F16D 3/66* (2013.01); *B25J 17/0241* (2013.01); *B25J 19/068* (2013.01); *F16D 3/50* (2013.01); *F16D 3/56* (2013.01); *F16D 3/64* (2013.01)

(58) Field of Classification Search
USPC ........ 464/62.1, 65.1, 66.1, 109; 74/30, 490.1; 318/568.11
See application file for complete search history.

(56) References Cited

U.S. PATENT DOCUMENTS

| 858,412 | A | * | 7/1907 | Neate | ........................ 464/65.1 X |
|---|---|---|---|---|---|
| 1,672,400 | A | * | 6/1928 | West | .............................. 464/109 |
| 1,707,530 | A | * | 4/1929 | Meseroll | ....................... 464/65.1 |
| 4,467,905 | A | * | 8/1984 | Takeuchi | |

OTHER PUBLICATIONS

International Search Report for corresponding International Patent Application No. PCT/IB2011/054193 mailed Dec. 13, 2011.
(Continued)

*Primary Examiner* — Gregory Binda
(74) *Attorney, Agent, or Firm* — Merchant & Gould P.C.

(57) ABSTRACT

A rotary joint (10; 110) includes an output member (12; 112) rotatable about a first axis of rotation ($x_1$), a first actuator device (14) arranged to generate a rotary motion about the first axis ($x_1$), an input member (16; 116) driven by the first actuator device (14; 114) about the first axis ($x_1$), elastic elements (20, 64; 120) between the input member (16; 116) and the output member (12; 112) and configured such that the transmission of the torque takes place via the elastic elements (20, 64; 120). A second actuator device (22; 122) is arranged to change the stiffness of the rotary joint (10; 110). The rotary joint (10; 110) includes an intermediate member (18; 118) hinged (44; 168) to the output member (12; 112) to rotate relative to the output member about a second axis of rotation ($x_2$) parallel to the first axis ($x_1$), abuts at its opposite end against the elastic elements (20, 64; 120) and is hinged (46; 150), at an intermediate point thereof, to the input member (16; 116) to rotate relative to the input member about a third axis of rotation ($x_3$) parallel to the first axis ($x_1$). Transmission of the torque between the input member (16; 116) and the output member (12; 112) takes place via the intermediate member (18; 118). The second actuator device (22; 122) is arranged to change the hinge point and the distance between the second axis of rotation ($x_2$) and the third axis of rotation ($x_3$).

13 Claims, 9 Drawing Sheets

(51) Int. Cl.
  *B25J 17/02* (2006.01)
  *B25J 19/06* (2006.01)
  *F16D 3/56* (2006.01)
  *F16D 3/64* (2006.01)
  *F16D 3/50* (2006.01)

(56) References Cited

OTHER PUBLICATIONS

Tsagarikis, N. et al. "A Novel Variable Stiffness Actuator: Minimizing the Energy Requirements for the Stiffness Regulation", 2010 Annual International Conference of the IEEE Engineering in Medicine and Biology Society: (EMBC 2010); Buenos Aires, Argentina, Aug. 31-Sep. 4, 2010, pp. 1275-1278.

Jafari, A. et al. "An Intrinsically Safe Actuator with the Ability to Adjust the Stiffness", The Seventh IARP Workshop on Technical Challenges for Dependable Robots in Human Environments (DRHE 2010), Jun. 16-Jun. 17, 2010, pp. 6PP.

Kong, K. et al. "Control of Rotarty Series Elastic Actuator for Ideal Force-Mode Actuation in Human-Robot Interaction Applications", IEEE/ASME Transactions on Mechatronics, vol. 14, No. 1, Feb. 1, 2009, pp. 105-118.

* cited by examiner

STIFFNESS ADJUSTABLE ROTARY JOINT

This application is a National Stage Application of PCT/IB2011/054193, filed 23 Sep. 2011, which claims benefit of Serial No. TO2010A000779, filed 23 Sep. 2010 in Italy and Serial No. TO2011A000100, filed 8 Feb. 2011, and which applications are incorporated herein by reference. To the extent appropriate, a claim of priority is made to each of the above disclosed applications.

BACKGROUND OF THE INVENTION

The present invention relates to a stiffness-adjustable rotary joint.

Stiffness-adjustable rotary joints have been developed and used in particular on robots intended to interact with the human beings, such as for instance humanoid robots and exoskeletons. These rotary joints have two degrees of freedom, namely position and stiffness, and require therefore the use of two separate actuators. They also require the use of elastic elements to provide the compliance which is necessary in order to ensure safety. The stiffness-adjustable rotary joints can be classified, depending on the position of the actuators and of the elastic elements, in the following two categories:

rotary joints with an antagonistic arrangement of the two actuators, in which the two actuators are arranged each in series with a non-linear elastic element and in which the position and the stiffness of the joint are controlled by means of the relative movement of the two actuators; and rotary joints in which one of the actuators is operable to change the position and the other actuator is arranged in series with an elastic element and is operable to change the stiffness through a mechanism allowing to obtain a non-linear stiffness characteristic.

The main requirements which have to be met in these rotary joints are:

compact sizes and reduced weight;

capability to change the stiffness with the minimum energy consumption possible; and wide range of change of the stiffness.

In most of the previous solutions, whether they belong to the first or to the second category indicated above, stiffness is changed by changing the preload of the elastic elements, which however involves a considerable energy consumption. A stiffness-adjustable rotary joint is disclosed in the paper "*An intrinsically safe actuator with the ability to adjust the stiffness*" presented on Jun. 16, 2010 during the 7th IARP Workshop on Technical Challenges for Dependable Robots in Human Environments held in Tolosa, as well as in the paper "*A novel variable stiffness actuator: minimizing the energy requirements for the stiffness regulation*" presented during the 32nd Annual International Conference of the IEEE EMBS held in Buenos Aires from Aug. 31, 2010 to Sep. 4, 2010. The rotary joint disclosed in the above-mentioned papers basically comprises an output member rotatable about a first axis of rotation, a first actuator device (made in particular as an electric motor and reduction gear assembly) arranged to generate a rotary motion about said first axis of rotation, an input member driven by the first actuator device to rotate about the above-mentioned axis of rotation, a pair of antagonistic springs each interposed between the input member and the output member in such a manner that the torque generated by the first actuator device is transmitted from the input member to the output member via these springs, and a second actuator device arranged to change the distance between the springs and said first axis of rotation, and hence the lever arm of the elastic force produced by the springs, in order to change the stiffness of the joint. According to this known rotary joint, therefore, the stiffness is changed by changing not the preload of the springs, but their position. Moreover, the direction of the movement required to change the position of the springs, and hence to change the stiffness of the joint, is perpendicular to the direction of the elastic force generated by the springs, and accordingly the energy consumption required to change the stiffness of the rotary joint would be theoretically equal to the sole energy consumption of the actuator device used to change the position of the springs. Actually, due to the presence of friction and due to the fact that in positions other than that of equilibrium the elastic force generated by the springs has a certain component, though small, along the direction of displacement of the springs, the energy consumption is higher than the theoretical one. It is however significantly lower than that of the rotary joints in which the stiffness is changed by changing the preload of the elastic elements, and therefore the second actuator device controlling the change of stiffness can be much more compact than that of the other stiffness-adjustable rotary joints. A further advantage of this known solution is that it does not require the use of non-linear springs or mechanisms to provide the non-linear stiffness characteristic required to adjust the stiffness.

SUMMARY OF THE INVENTION

It is an object of the present invention to provide a stiffness-adjustable rotary joint which is even more compact and light, which has an even lower energy consumption and which allows to adjust the stiffness in an even wider range than the prior art discussed above.

Preferred embodiments of a stiffness-adjustable rotary joint according to the present invention are the subject-matter of the dependent claims, the content of which is to be regarded as an integral and integrating part of the present specification.

In short, the invention is based on the idea of providing a stiffness-adjustable rotary joint of the above-identified type, wherein the rotary joint further comprises an intermediate member which is hinged at an end thereof to the output member so as to rotate relative to this latter about a second axis of rotation parallel to the first axis of rotation, abuts at its opposite end against the elastic means and is hinged, in an intermediate point thereof positioned between the point at which it is hinged to the output member and the point at which the elastic force generated by the elastic means is applied, to the input member so as to rotate relative to this latter about a third axis of rotation parallel to the first axis of rotation, in such a manner that the transmission of the torque between the input member and the output member takes place via the intermediate member, and wherein the second actuator device is arranged to change the position of the hinge point of the input member with the intermediate member, so as to change the distance between the second axis of rotation and the third axis of rotation. The displacement of this hinge point results in a change of the ratio of the lever arm of the force transmitted between the intermediate member and the output member at the hinge point at which these members are hinged to each other, to the lever arm of the force transmitted between the intermediate member and the elastic means, and hence a change of the stiffness of the rotary joint, intended as the ratio of the torque applied to the angular deflection due to this torque. In the rotary joint according to the invention, therefore, the stiffness is not changed by changing the preload or the position of the springs, but by changing the elastic force applied by the elastic means by virtue of a mechanism having an adjustable lever ratio. Accordingly, the energy consumption required to change the stiffness is extremely low. Moreover, the stiffness can be changed in the widest range possible, namely from zero to infinite, irrespective of the characteristics of the springs used as elastic means. Additionally, the rotary joint according to the invention has a compact and light structure, which is also due to the fact that the reduced power required to change the position of the hinge point of the intermediate member with the output member allows the use, as a second actuator device, of an electric motor of reduced sizes and weight.

According to an advantageous embodiment of the present invention, the intermediate member is configured as a lever which extends in a plane perpendicular to the second axis of rotation and has a cam-shaped lateral surface, and additionally the elastic means comprise a pair of idle rollers located on opposite sides of a plane passing through the second axis of rotation and a pair of elastic elements each arranged to urge a respective roller against the lateral surface of the intermediate member.

Preferably, the elastic elements are configured in such a manner that the elastic forces applied by them on the intermediate member through the rollers are directed along the same direction. Preferably, the direction along which the elastic forces applied by the elastic elements on the intermediate member through the rollers are directed passes through the first axis of rotation and is perpendicular to this axis. Preferably, the elastic elements abut each at the one end against the respective roller and at the opposite end against a respective abutment element secured to the input member. Preferably, the elastic elements are cylindrical helical springs arranged with the respective axes aligned along the above-mentioned same direction. By virtue of such a configuration of the elastic means, a further reduction of the size, in particular of the transverse size (i.e. the size in a plane perpendicular to the axes of rotation of the input member, of the intermediate member and of the output member), of the rotary joint can be obtained. The range of possible applications of the rotary joint is therefore even wider, as the joint is able to meet even more stringent requirements in terms of maximum size.

According to an advantageous embodiment of the present invention, the second actuator device comprises a motor, in particular an electric motor, for generating a rotary motion and a motion conversion mechanism for converting the rotary motion generated by the motor into a translational motion, wherein the motor and the motion conversion mechanism are carried by the input member so as to be drivingly connected for rotation with this latter, wherein the motion conversion mechanism comprises a pinion arranged to be driven by the motor to rotate in either direction and a rack permanently meshing with the pinion to be driven by this latter to translate in either direction, and wherein the intermediate member is hinged to the input member by means of a hinge pin carried by the rack so as to be drivingly connected for translation with this latter. Preferably, the rack is arranged so as to translate along a direction passing through the first axis of rotation and perpendicular to this latter, in such a manner that the hinge pin by means of which the rack is hinged to the intermediate member, and which defines the third axis of rotation, is movable along this direction. By virtue of such a configuration of the second actuator device, and in particular by virtue of the rack being oriented in a "radial" direction, i.e. in a direction passing through the first axis of rotation and perpendicular to this latter, and of the pinion, along with the associated motor, being arranged with its own axis oriented perpendicular to the above-mentioned "radial" direction, a further reduction of the size, in particular of the transverse size (i.e. of the size in a plane perpendicular to the axes of rotation of the input member, of the intermediate member and of the output member), of the rotary joint can be obtained.

BRIEF DESCRIPTION OF THE DRAWINGS

Further features and advantages of the present invention will appear from the following detailed description, given purely by way of non-limiting example with reference to the appended drawings, in which.

DETAILED DESCRIPTION OF THE PREFERRED EMBODIMENTS

With reference first to FIGS. 1 to 6, a stiffness-adjustable rotary joint according to a first preferred embodiment of the present invention is generally indicated 10 and basically comprises:

an output member 12 rotatable about an axis of rotation $x_1$, a first actuator device 14 arranged to generate a rotary motion about the axis of rotation $x_1$, an input member 16 driven by the first actuator device 14 to rotate about the axis of rotation $x_1$, an intermediate member 18 which is made as a lever and is hinged at an end thereof to the output member 12, in such a manner that the intermediate member 18 is able to rotate relative to the output member 12 about a stationary axis of rotation $x_2$, which is parallel to the axis of rotation $x_1$ and is placed at a certain (constant) distance from this latter, and at an intermediate point thereof to the input member 16, in such a manner that the intermediate member 18 is able to rotate relative to the input member 16 about a movable axis of rotation $x_3$ (FIG. 4), which is parallel to the axis of rotation $x_1$ and is placed at a certain (variable from zero to a given maximum value) distance from this latter, a pair of elastic elements 20 which are located on opposite sides of the intermediate member 18 with respect to a plane passing through the axis of rotation $x_1$ and through a longitudinal axis of the intermediate member 18 (indicated $y_2$ in FIG. 4) and are arranged to apply each an elastic force on this member, in such a manner that the rotary joint 10 has a certain compliance due to the possibility for the intermediate member 18 to pivot about the hinge axis about which it is hinged to the input member (axis of rotation x) as a result of the deformation of the elastic elements 20, and a second actuator device 22 arranged to move the hinge point at which the intermediate member 18 is hinged to the input member 16, and hence the distance between the axes of rotation $x_1$ and $x_3$, along an axis (indicated $y_1$ in FIG. 4) passing through the axis of rotation $x_2$ and perpendicular to this latter, so as to change the ratio of the lever arm of the force transmitted between the intermediate member 18 and the output member 12 at the hinge point at which these members are hinged to each other, to the lever arm of the force transmitted between the intermediate member 18 and the elastic elements 20, and hence the stiffness of the rotary joint, as will be better explained in the following part of the description.

The first actuator device 14, which controls the angular position of the input member 16, and hence of the output member 12, of the rotary joint 10 about the axis of rotation $x_1$ and which therefore will be hereinafter referred to also as position actuator, is preferably a rotary electric motor to which a reduction gear may be associated. The position actuator 14 is mounted on a support structure or base 24.

The input member 16 comprises a cylindrical body 26 which is arranged with its own axis coaxial with the axis of rotation $x_1$ and inside which the elastic elements 20 and the second actuator device 22 are accommodated, as will be explained in detail further on. The cylindrical body 26 of the input member 16 comprises a bottom base 28 to which a connection plate 30 is attached, the connection plate 30 being in turn attached to an output member 32 of the position actuator 14 to be driven in rotation by this latter and being rotatably supported by the support structure 24 by means of a bearing 34.

The output member 12 comprises a disc 36 which is arranged so as to close the cylindrical body 26 of the input member 16 on the top side and is rotatably supported by this latter by means of a bearing 38. In the illustrated embodiment, the output member 12 further comprises an arm 40 which is attached to the disc 36 and extends along a direction which is perpendicular to the axis of rotation $x_1$, preferably parallel to the axis $y_1$. Naturally, depending on the specific application of the rotary joint, the arm 40 might even be omitted or have a shape different from the one here illustrated. The disc 36 has a circular through hole 42 through which a hinge pin 44 passes, the output member 12 being hinged through the hinge pin 44 to the intermediate member 18 to rotate relative to this latter about the axis of rotation $x_2$.

Figure 3:
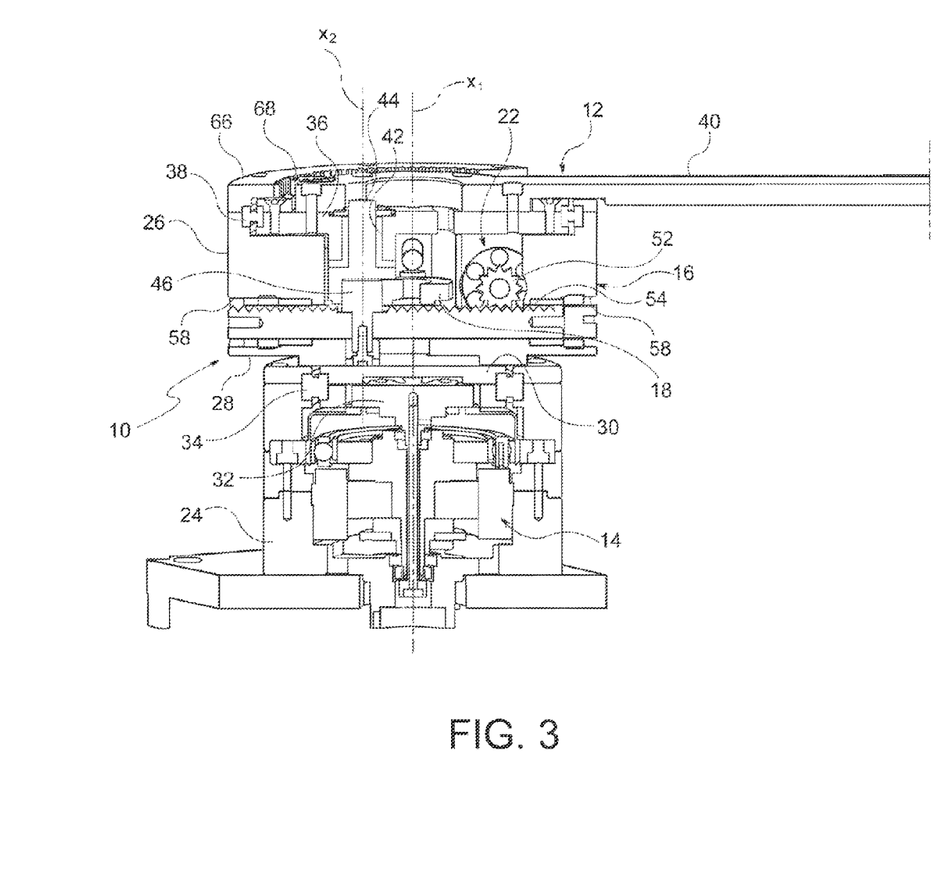
FIG. 3 is a section view of the rotary joint of FIG. 1 in a section plane passing through the axis of rotation of the rotary joint.
Figure 4:
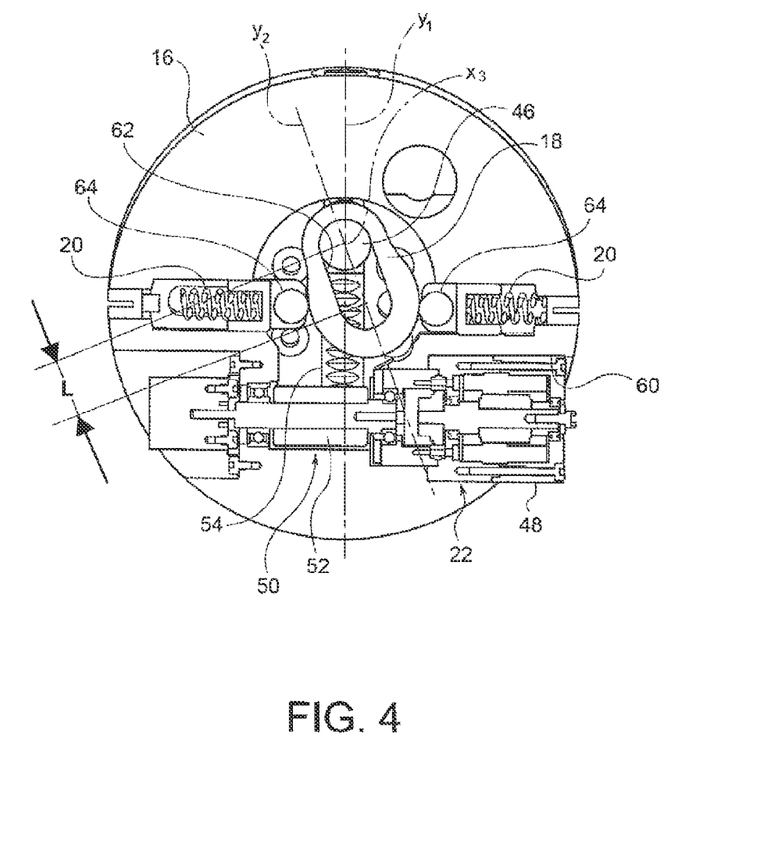
FIG. 4 is a section view from above of the rotary joint of FIG. 1 in a section plane perpendicular to the axis of rotation of the rotary joint.
Figure 5:
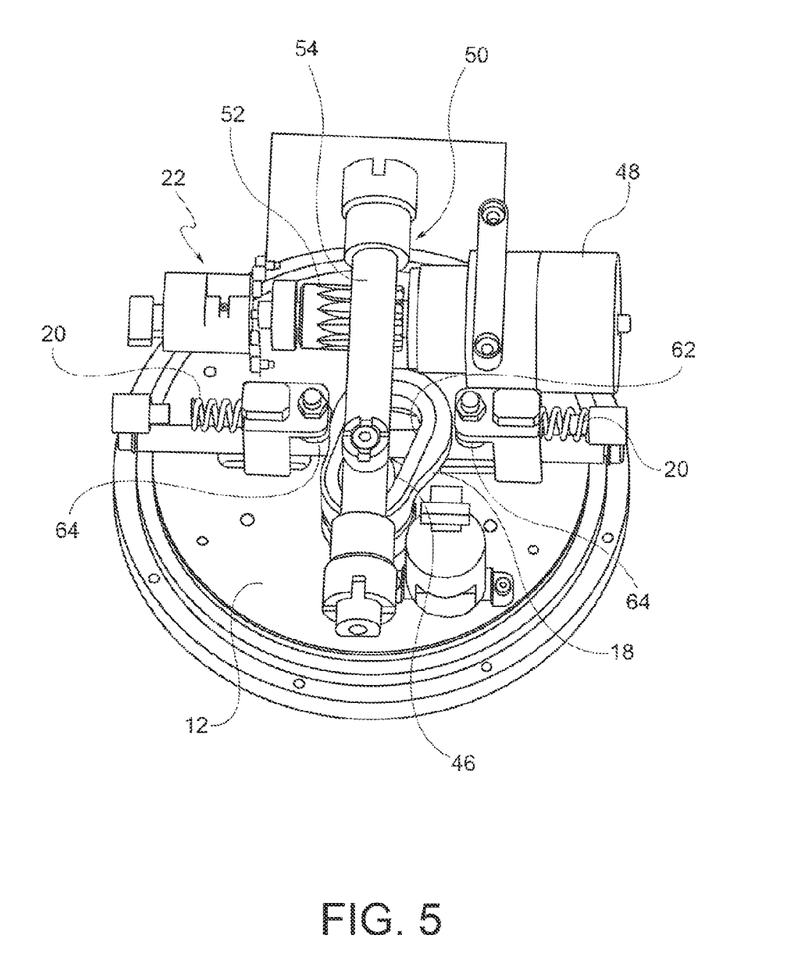
FIG. 5 is a perspective view from below which shows in detail the intermediate member and the second actuator device of the rotary joint of FIG. 1.
Figure 6:
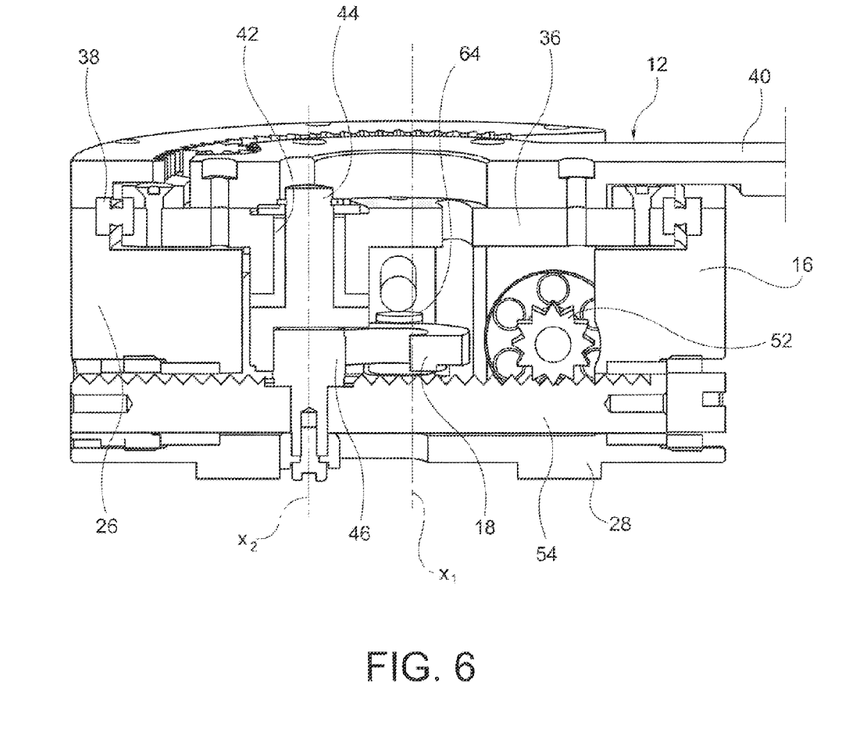
FIG. 6 is a section view in a section plane passing through the axis of rotation of the rotary joint, which shows in detail the intermediate member and the second actuator device of the rotary joint of FIG. 1.
Figure 7:
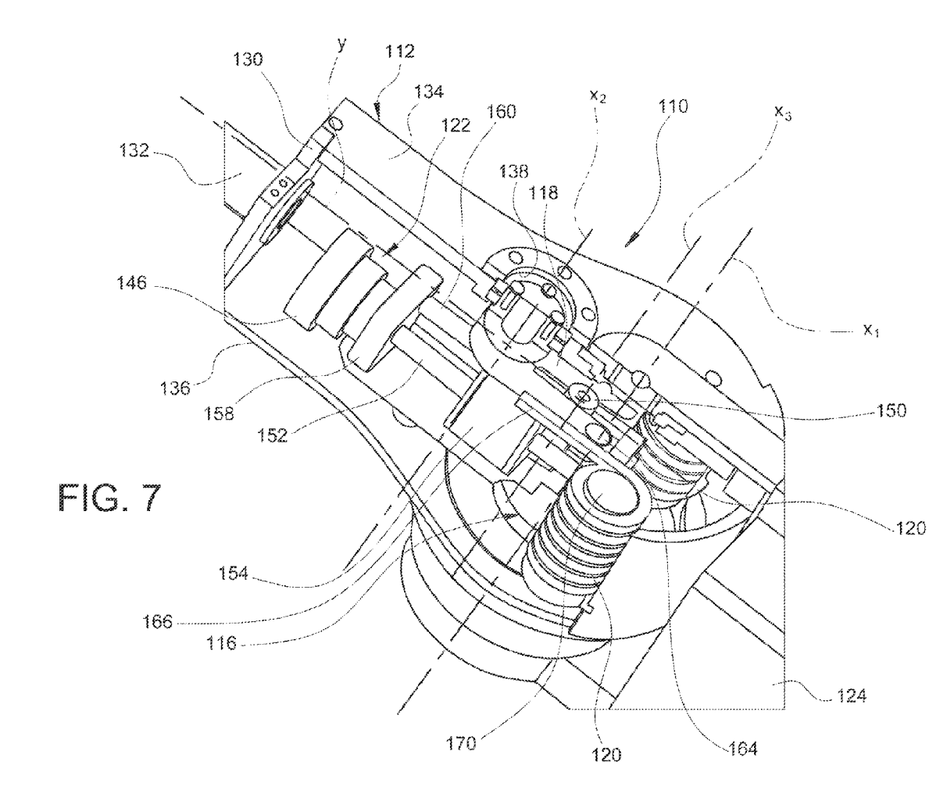
FIG. 7 is a perspective view, partially in phantom, of a stiffness-adjustable rotary joint according to a further preferred embodiment of the present invention.

With reference in particular to FIGS. 3 to 5, the second actuator device 22 (also referred to in the following part of the description as stiffness actuator, since it has the function of changing the stiffness of the rotary joint) is made as a linear actuator arranged to move along the axis $y_1$ a hinge pin 46 by means of which the input member 16 is hinged to the intermediate member 18, and hence to change the distance between the axis of rotation $x_3$ and the axis of rotation $x_1$. In this connection, the stiffness actuator 22 comprises an electric motor 48 arranged to generate a rotary motion about an axis parallel to the axis $y_1$ and a motion conversion mechanism 50 arranged to convert the rotary motion produced by the electric motor 48 into a translational motion of the hinge pin 46 along the axis $y_1$. The motion conversion mechanism 50 is made as a pinion and rack mechanism and comprises a pinion 52, which is fixed to a drive shaft of the electric motor 48 to be driven by this latter to rotate in either direction, and a rack 54, which permanently meshes with the pinion 52 to be driven by this latter to translate in either direction along the axis $y_1$. The hinge pin 46 is carried by the rack 54 so as to be drivingly connected for translation with this latter along the axis $y_1$. The rack 54 is supported by the input member 16, and in particular is guided at its opposite ends in a pair of coaxial holes 58 provided in the lateral wall of the cylindrical body 26 of the input member 16. The electric motor 48 and the pinion 52 are also suitably supported by the input member 16, the electric motor 48 being in particular received in a special cavity 60 provided in the lateral wall of the cylindrical body 26 of the input member 16.

With reference in particular to FIGS. 4 and 5, the intermediate member 18 has a slit 62 which extends along the axis $y_2$ (longitudinal axis of the intermediate member 18) and in which the hinge pin 46 slidably engages. The slit 62 is advantageously configured in such a manner that the hinge pin 46 is movable between a first end-of-travel position, in which the axis of rotation $x_3$ is aligned with the axis of rotation $x_1$, and a second end-of-travel position, in which the axis of rotation $x_3$ is aligned with the axis of rotation $x_2$. The intermediate member 18 has a cam-shaped lateral surface, which is advantageously symmetrical with respect to the axis $y_2$ and against which a pair of idle rollers 64 are held in abutment by the elastic elements 20, the idle rollers 64 being located on opposite sides with respect to a plane passing through the axis of rotation $x_2$ and through the axis $y_z$. More specifically, each elastic element 20 is interposed between the lateral wall of the cylindrical body 26 of the input member 16 and a respective roller 64 and is configured to apply on this latter an elastic force tending to urge it against the lateral surface of the intermediate member 18. Preferably, the elastic elements 20 are configured in such a manner that the elastic forces they apply on the intermediate member 18 through the rollers 64 are directed along the same direction, in particular along a direction passing through the axis of rotation $x_1$ and perpendicular to this latter. Advantageously, the elastic elements 20 are made as cylindrical helical springs and are arranged with the respective axes aligned along the above-mentioned same direction. Moreover, adjusting devices (of per-se-known type) are advantageously associated to the elastic elements 20 and allow to adjust the preload of the elastic elements 20.

Figure 1:
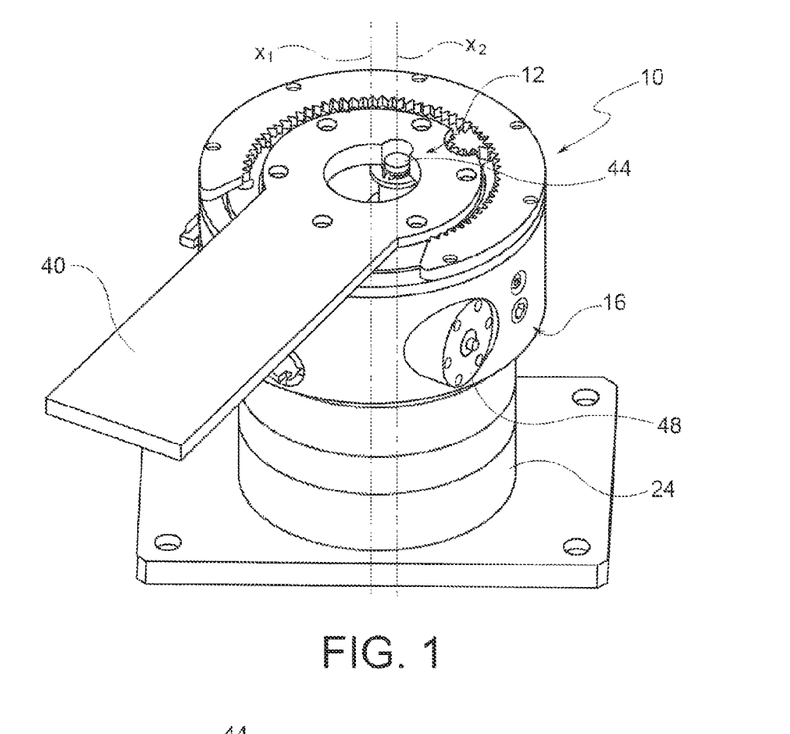
FIG. 1 is a perspective view, partially in phantom, of a stiffness-adjustable rotary joint according to a first preferred embodiment of the present invention.
Figure 2:
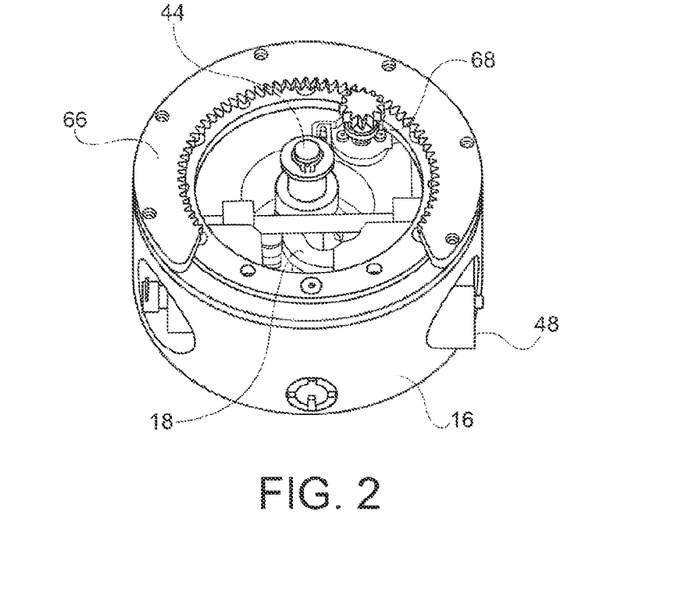
FIG. 2 is a perspective view, partially in phantom, of a portion of the rotary joint of FIG. 1.

As shown in particular in FIGS. 2 and 3, the rotary joint 10 is also provided with a sensor device arranged to detect the relative rotary movement between the input member 16 and the output member 12. This sensor device comprises an internally-toothed ring gear 66 which is fixed to the top face of the cylindrical body 26 of the input member 16 and is arranged coaxially to this latter, an idle pinion 68 which is supported by the disc 36 of the output member 12 and permanently meshes with the internally-toothed ring gear 66, and an encoder (not shown) which is connected to the pinion 68 to detect the angular position thereof. By virtue of such a configuration, the sensor device has a very high sensitivity, which helps to increase the fluidity of response of the rotary joint, and also takes less space than that typically taken when the encoder is placed along the axis of rotation of the rotary joint, which helps to make the rotary joint as compact as possible.

The operation of the rotary joint 10 according to this first embodiment of the present invention is the following. The torque generated by the position actuator 14 is transmitted to the output member 12, passing in order through the input member 16 and the intermediate member 18. The stiffness actuator 22 allows to change the stiffness of the rotary joint by changing the ratio of the lever arm of the force transmitted between the intermediate member 18 and the output member 12 at the hinge pin 44 to the lever arm of the force transmitted between the intermediate member 18 and the elastic elements 20. The stiffness of the rotary joint 10, defined as the ratio of the torque applied to the angular deflection due to this torque, is proportional to $K_S r^2 L^2$, where $K_S$ is the stiffness of each elastic element 20, r is the ratio of the distance of the axis of rotation $x_3$ (axis of the hinge pin 46—movable pin) from the axis of rotation $x_1$ (axis of rotation of the input member 16 and of the output member 12) to the distance of the axis of rotation $x_3$ from the axis of rotation $x_2$ (axis of the hinge pin 44—stationary pin) and L is the sum of the above-mentioned distances (in other words, the distance between the end-of-travel positions of the hinge pin 46 defined above). The stiffness $K_S$ of the elastic elements 20 and the distance L being fixed, the stiffness of the rotary joint 10 can thus change from 0 (with r equal to 0, i.e. when the hinge pin 46 is aligned with the axis of rotation $x_1$ of the input member 16 and of the output member 12) to infinite (with r tending to infinite, i.e. when the hinge pin 46 is aligned with the hinge pin 44). By changing therefore the position of the hinge pin 46 along the slit 62 of the intermediate member 18 by means of the stiffness actuator 22, it is possible to change the stiffness of the rotary joint 10 in a theoretically infinite range, thereby making the rotary joint according to the invention suitable for any application.

Figure 9:
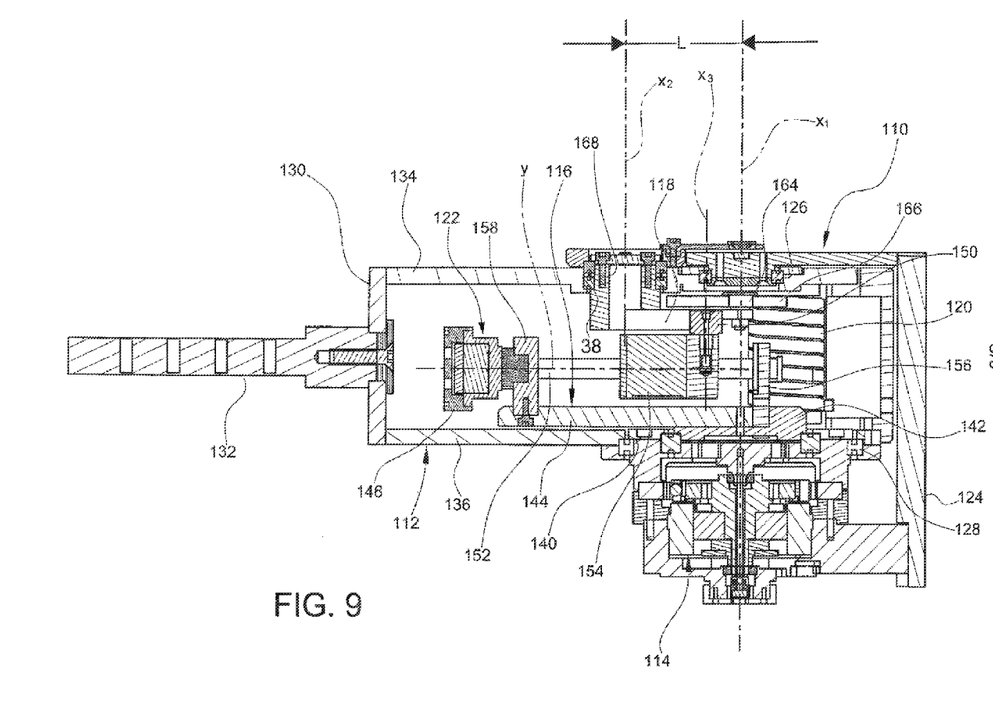
FIG. 9 is an axial section view of the rotary joint of FIG. 7.

With reference now to FIGS. 7 to 10, a stiffness-adjustable rotary joint according to a further embodiment preferred of the present invention is generally indicated 110 and basically comprises:

an output member 112 rotatable about an axis of rotation $x_1$, a first actuator device 114 arranged to generate a rotary motion about the axis of rotation $x_1$, an input member 116 driven by the first actuator device 114 for rotation about the axis of rotation $x_1$, an intermediate member 118 made as a lever which is hinged at an end thereof to the output member 112, in such a manner that the intermediate member 118 is able to rotate relative to the output member 112 about an axis of rotation $x_2$ parallel to the axis of rotation $x_1$, and at an intermediate point thereof (movable along the longitudinal direction of the intermediate member, indicated y in FIG. 9) to the input member 116, in such a manner that the intermediate member 118 is able to rotate relative to the input member 116 about an axis of rotation $x_3$ parallel to the axis of rotation $x_1$, a pair of springs 120 which are located on opposite sides of the intermediate member 118 with respect to a plane passing through the axes $x_1$ and y and abut against the end of the intermediate member 118 opposite to the one at which this member is hinged to the output member 112, in such a manner that the rotary joint 110 has a certain compliance by virtue of the possibility for the intermediate member 118 to pivot about the axis of rotation $x_3$ as a result of the elastic deformation of the springs 120, and a second actuator device 122 arranged to move the hinge point at which the intermediate member 118 is hinged to the input member 116 along the axis y, so as to change the ratio of the lever arm of the force transmitted between the intermediate member 118 and the output member 112 at the hinge point at which these members are hinged to each other, to the lever arm of the force transmitted between the intermediate member 118 and the springs 120, and hence the stiffness of the joint, as will be better explained further on.

The first actuator device 114, which controls the position of the output member 112 of the rotary joint 110 and which therefore will be hereinafter referred to also as position actuator, is preferably a rotary electric motor to which a reduction gear can be associated. The position actuator 114 is mounted on a support structure or base 124.

As shown in FIG. 9, the output member 112 is rotatably supported at the one end (top end, according to the observer of FIG. 9) on the support structure 124 by means of a bearing 126, and at the opposite end (bottom end, according to the observer of FIG. 9) on the stationary part of the electric motor working as position actuator 114 by means of a bearing 128. The output member 112 comprises a casing 130, which accommodates the input member 116, the intermediate member 118 and the springs 120, and an arm 132 which is attached to the casing 130 and extends for instance along a direction perpendicular to the axis of rotation $x_1$, preferably parallel to the direction y. Naturally, depending on the specific application of the rotary joint, the arm 132 of the output member 112 might even be omitted or have a shape different from the one here illustrated. The casing 130 of the output member 112 comprises a pair of opposite parallel bases 134 and 136 (a top base and a bottom base, respectively, according to the point of view of the observer of FIG. 9), wherein the top base 134 has a circular through hole 138 next to the hinge point at which the output member 112 is hinged to the intermediate member 118, while the bottom base 136 has, next to the position actuator 114, a circular through hole 140 through which the intermediate member 118 is connected for rotation with the movable part of the position actuator 114.

The input member 116 comprises a head plate 142 of circular shape, which is received in the circular through hole 140 of the bottom base 136 of the output member and is connected for rotation (for instance by means of screws) with the movable part of the position actuator 114, and an elongated plate 144, which is attached to the head plate 142 and which has for instance a rectangular shape with the long sides parallel to the direction y.

Figure 10:
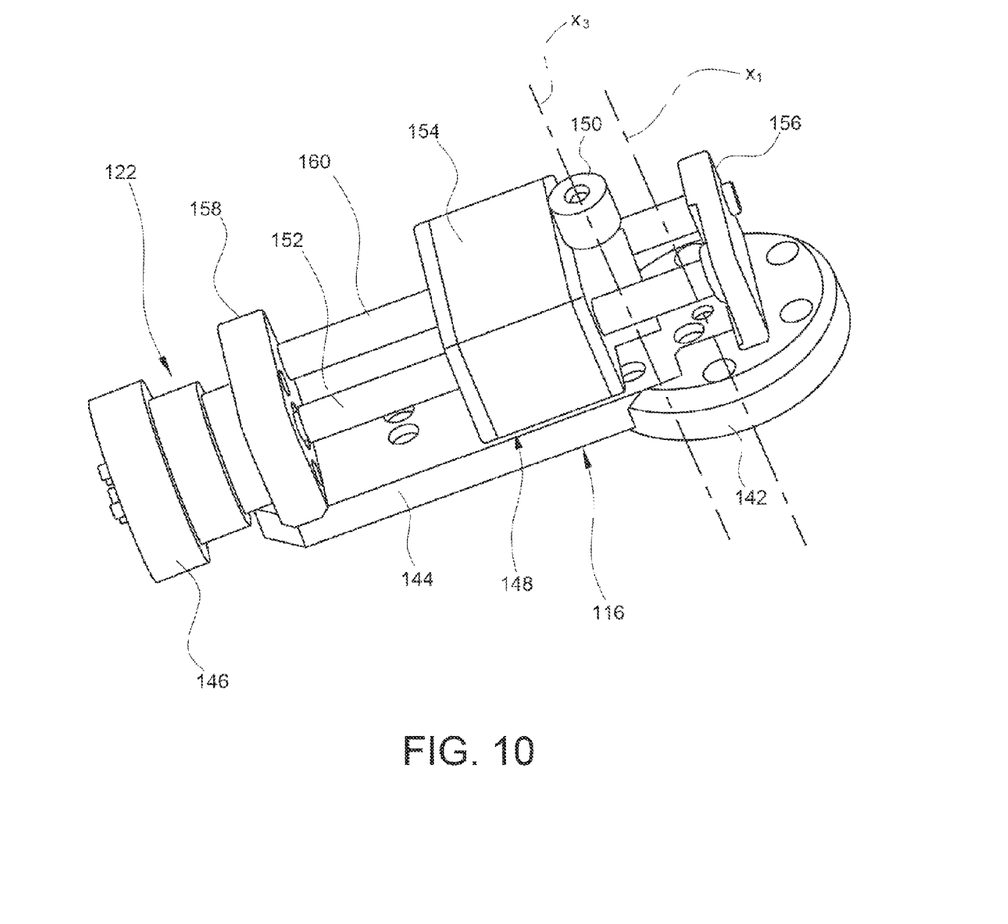
FIG. 10 is a perspective view showing in detail the second actuator device of the rotary joint of FIG. 7.

With reference also to FIG. 10, the second actuator device 122 (hereinafter referred to also as stiffness actuator, since it has the function of changing the stiffness of the rotary joint) is mounted on the input member 116 and is made as a linear actuator arranged to move the hinge point at which the input member 116 is hinged to the intermediate member 118 (and hence the position of the axis of rotation $x_3$) along the direction y. In this connection, the stiffness actuator 122 comprises an electric motor 146 arranged to generate a rotary motion about an axis parallel to the direction y and a motion conversion mechanism 148 arranged to convert the rotary motion generated by the electric motor 146 into a translational motion along the direction y of a hinge pin 150 by means of which the input member 116 is hinged to the intermediate member 118 so as to rotate relative to this latter about the axis of rotation $x_3$. The motion conversion mechanism 148 comprises an endless screw 152, which is oriented with its own axis parallel to the direction y and is arranged to be driven in rotation by the electric motor 146, and a nut screw 154 cooperating with the endless screw 152 to be moved along the direction y as a result of the rotation of the endless screw. The hinge pin 150 is carried by the nut screw 154 so as to translate with this latter along the direction y. The endless screw 152 is supported at its ends by a pair of support plates 156 and 158 which are attached to the head plate 142 and to the elongated plate 144 of the input member, respectively. The support plate 156 also supports the electric motor 146. A guide rod 160, which passes through a through hole (not shown) provided in the nut screw 154 so as to prevent this latter from rotating about the axis of the endless screw 152, extends between the two support plates 156 and 158 parallel to the endless screw 152.

Figure 8:
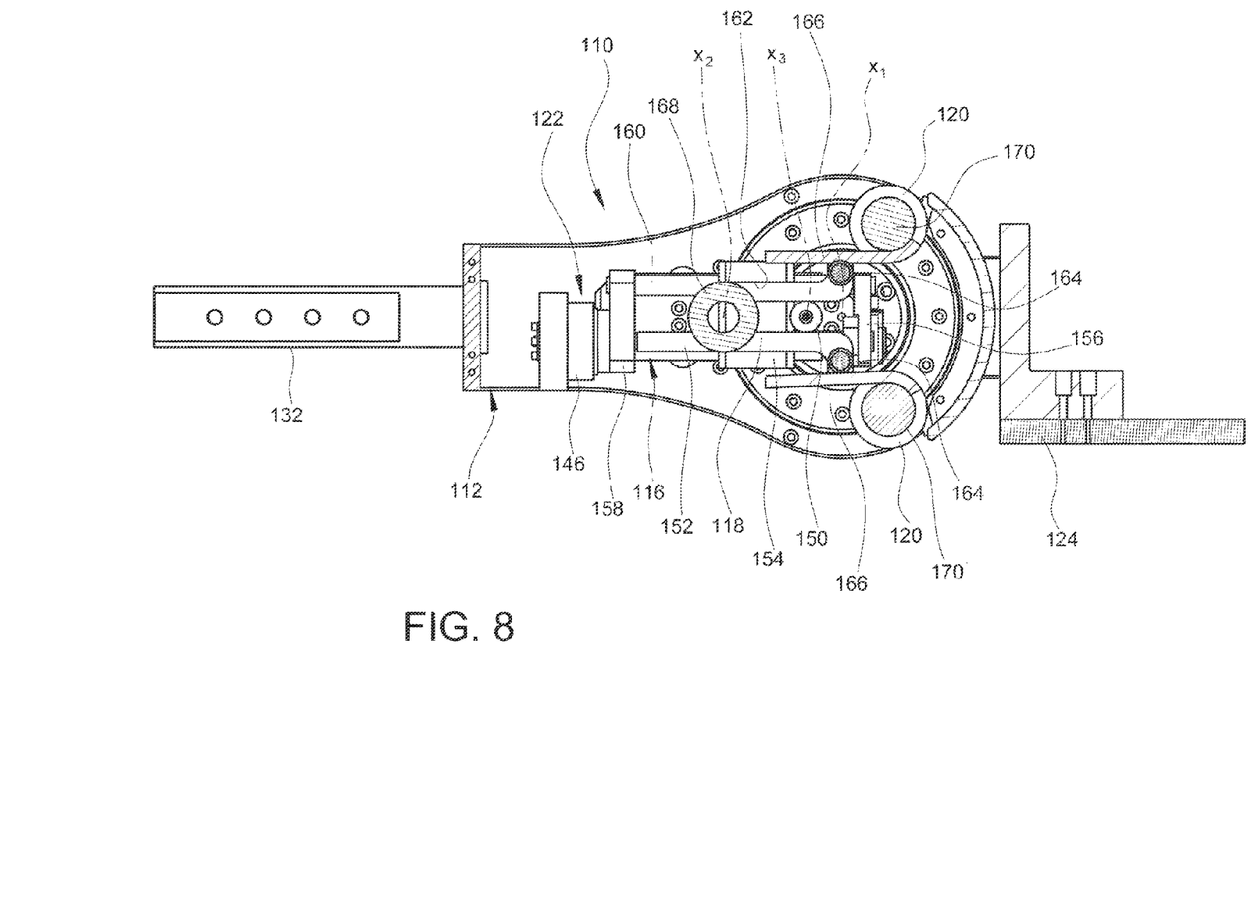
FIG. 8 is a view from above of the rotary joint of FIG. 7, from which the upper cover of the output member has been removed.

With reference in particular to FIGS. 8 and 9, the intermediate member 118 has a longitudinal slit 162 which extends along the direction y and in which the hinge pin 150 slidably engages. At the end of the intermediate member 118 facing towards the springs 120 (right-hand end, relative to the point of view of the observer of FIGS. 8 and 9), the intermediate member 118 is provided with a pair of rollers 164, which are rotatably mounted each about a respective axis of rotation parallel to the axis of rotation $x_1$ and abut each against either of the radial end arms 166 (upper arm, with respect to the point of view of the observer of FIG. 9) of the respective spring 120. A hinge pin 168 is attached to the opposite end of the intermediate member 118 and is rotatably mounted in the circular through hole 138 of the top base 134 of the output member 112 for articulated connection between the intermediate member 118 and the output member 112 about the axis of rotation $x_2$.

The springs 120 are made as cylindrical helical springs which are wound about respective pins 170 fixed to the output member 112 and have their axes oriented parallel to the axis of rotation $x_1$. As already stated, the radial end arms 166 of the springs 120 abut, on opposite sides, against the end of the intermediate member 118 opposite to the one at which the intermediate member 118 is hinged to the output member 112, so as to apply antagonistically an elastic reaction torque on the intermediate member 118 when this latter pivots about the axis of rotation $x_3$ defined by the hinge pin 150. The contact points between the radial end arms 166 of the springs 120 and the rollers 164 of the intermediate member 118 are advantageously aligned with the axis of rotation $x_1$ about which the output member 112 rotates, in that a straight line passing through these contact points passes also through the axis of rotation $x_1$.

The operation of the rotary joint 110 according to this further embodiment of the present invention is the following. The position actuator 114 allows to change the angular position of the output member 112 about the axis of rotation $x_1$. The torque generated by the position actuator 114 is transmitted to the output member 112, passing in order through the input member 116 and the intermediate member 118. The stiffness actuator 122 allows to change the stiffness of the rotary joint by changing the ratio of the lever arm of the force transmitted between the intermediate member 118 and the output member 112 at the hinge pin 168 to the lever arm of the force transmitted between the intermediate member 118 and the springs 120. The stiffness of the rotary joint 110, defined as the ratio of the torque applied to the angular deflection due to this torque, is equal to $2K_S r^2 L^2$, where $K_S$ is the stiffness of each of the springs 120, r is the ratio of the distance of the axis of rotation $x_3$ (axis of the hinge pin 150) from the axis of rotation $x_1$ (axis of rotation of the output member 112) to the distance of the axis of rotation $x_3$ from the axis of rotation $x_2$ (axis of the hinge pin 168) and L is the length of the intermediate member 118. The stiffness $K_S$ of the springs 120 and the length L of the intermediate member 118 being fixed, the stiffness K of the rotary joint 110 can thus change from 0 (with r equal to 0, i.e. when the hinge pin 150 is aligned with the axis of rotation $x_1$ of the output member 112) to infinite (with r tending to infinite, i.e. when the hinge pin 150 is aligned with the hinge pin 168). By changing therefore the position of the hinge pin 150 along the longitudinal slit 162 of the intermediate member 118 by means of the stiffness actuator 122, it is possible to change the stiffness of the rotary joint 110 in a theoretically infinite range, thereby making the rotary joint according to the invention suitable for any application.

In addition to the possibility of changing the stiffness as desired, the rotary joint according to the present invention offers the advantage of having a compact and light structure and of requiring very little energy to change the stiffness.

Naturally, the principle of the invention remaining unchanged, the embodiments and the constructional details may vary widely with respect to those described and illustrated purely by way of non-limiting example, without thereby departing from the scope of the invention as defined in the appended claims.

The invention claimed is:

1. Stiffness-adjustable rotary joint comprising:
    an output member rotatable about a first axis of rotation,
    a first actuator device arranged to generate a rotary motion about said first axis of rotation,
    an input member arranged to be driven in rotation by said first actuator device about said first axis of rotation,
    elastic means disposed between the input member and the output member,
    a second actuator device arranged to change the stiffness of the rotary joint, and
    an intermediate member which is hinged at an end region thereof to the output member so as to rotate relative to the output member about a second axis of rotation parallel to said first axis of rotation, abuts at an opposite end region thereof against said elastic means and is hinged to the input member so as to rotate relative to the input member about a third axis of rotation parallel to said first axis of rotation, wherein the transmission of the torque between the input member and the output member takes place via the intermediate member,
    wherein said second actuator device is arranged to change the position of the hinge point at which the intermediate member is hinged to the input member; and
    wherein the intermediate member is configured as a lever extending in a plane perpendicular to said second axis of rotation and has a slit extending along a longitudinal axis which is perpendicular to and passes through said second axis of rotation, and wherein the intermediate member is hinged to the input member by a hinge pin which slidably engages in said slit.

2. Rotary joint according to claim 1, wherein the intermediate member has a cam-shaped lateral surface and wherein said elastic means comprise a pair of idle rollers placed on opposite sides of a plane passing through said second axis of rotation and through said longitudinal axis and a pair of elastic elements each arranged to urge a respective roller against the lateral surface of the intermediate member.

3. Rotary joint according to claim 2, wherein the elastic elements are configured in such a manner that the elastic forces the elastic elements apply on the intermediate member through the rollers are directed along the same direction which is perpendicular to said longitudinal axis, passes through said first axis of rotation and is perpendicular to the first axis of rotation.

4. Rotary joint according to claim 2, wherein the elastic elements abut each at one end against the respective roller and at an opposite end against a respective abutment element of the input member.

5. Rotary joint according to claim 2, wherein said elastic elements are cylindrical helical springs.

6. Rotary joint according to claim 1, wherein said second actuator device comprises a motor arranged to generate a rotary motion and a motion conversion mechanism arranged to convert the rotary motion generated by said motor into a translational motion of the hinge pin along an axis of translation perpendicular to and passing through said first axis of rotation, and wherein said motor and said motion conversion mechanism are carried by the input member to be drivingly connected for rotation with the input member.

7. Rotary joint according to claim 6, wherein said motion conversion mechanism comprises a pinion arranged to be driven in rotation by said motor in either direction and a rack permanently meshing with the pinion to be driven in translation by the pinion in either direction along said axis of translation, and wherein the hinge pin is carried by the rack to be drivingly connected for translation with the rack.

8. Rotary joint according to claim 7, wherein the pinion is mounted so as to rotate about an axis parallel to a direction along which the elastic elements act on the intermediate member through the rollers.

9. Rotary joint according to claim 6, wherein said motion conversion mechanism comprises an endless screw and a nut screw cooperating with the endless screw to be moved along said direction of translation, and wherein the hinge pin is carried by the nut screw to be drivingly connected for translation with the nut screw.

10. Rotary joint according to claim 1, wherein said first actuator device comprises a rotary electric motor.

11. Stiffness-adjustable rotary joint comprising:
   an output member rotatable about a first axis of rotation;
   a first actuator device arranged to generate a rotary motion about said first axis of rotation;
   an input member arranged to be driven in rotation by said first actuator device about said first axis of rotation;
   elastic means disposed between the input member and the output member;
   a second actuator device arranged to change the stiffness of the rotary joint;
   an intermediate member which is hinged at an end region thereof to the output member so as to rotate relative to the output member about a second axis of rotation parallel to said first axis of rotation, abuts at an opposite end region thereof against said elastic means and is hinged to the input member so as to rotate relative to the input member about a third axis of rotation parallel to said first axis of rotation, wherein the transmission of the torque between the input member and the output member takes place via the intermediate member;
   wherein said second actuator device is arranged to change the position of the hinge point at which the intermediate member is hinged to the input member;
   wherein said elastic means comprise a pair of cylindrical helical springs which are wound about respective pins fixed to the output member and have axes oriented parallel to said first axis of rotation; and
   wherein the intermediate member is provided, at an end facing towards the springs, with a pair of rollers which are rotatably mounted each about a respective axis of rotation parallel to said first axis of rotation and abut each against a radial end arm of the respective spring.

12. Rotary joint according to claim 11, wherein the rollers are arranged so that points of contact with the radial end arms of the springs are disposed on a straight line passing through said first axis of rotation.

13. Rotary joint according to claim 11, wherein said first actuator device comprises a rotary electric motor.

* * * * *